United States Patent Office 3,823,131
Patented July 9, 1974

3,823,131
DIALKYLAMINO DISAZO SULFONIC ACID
DYESTUFFS
Hans Alfred Stingl, Toms River, N.J., assignor to Toms
River Chemical Corporation, Toms River, N.J.
No Drawing. Filed June 23, 1971, Ser. No. 156,057
Int. Cl. C09b 31/04, 31/08; D06p 1/06
U.S. Cl. 260—186    7 Claims

ABSTRACT OF THE DISCLOSURE

Dyestuffs of the formula

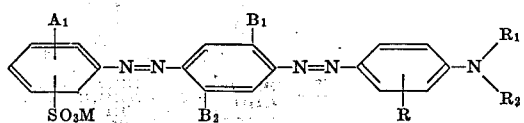

in which $A_1$ is hydrogen, alkyl, alkoxy, halo or trifluoromethyl, $B_1$ and $B_2$ are each hydrogen, lower alkoxy, lower alkyl, chloro or bromo, M is hydrogen, alkali metal or $NH_4^+$, R is hydrogen, alkyl, alkoxy, trifluoromethyl, chloro, bromo or fluoro, and $R_1$ and $R_2$ are each alkyl, hydroxyalkyl, cyanoalkyl, lower aralkyl or substituted lower aralkyl. The dyes have a good affinity for natural and synthetic polyamide fibers and show good light fastness, solubility, wash and perspiration fastness as well as good barré coverage.

BACKGROUND OF THE INVENTION

The dyestuffs of this invention are valuable for dyeing natural and synthetic polyamide fibers having good light fastness, wet fastness and barré coverage. In comparison with dyestuffs as described in British Pat. 1,198,886, the dyestuffs of this invention display better transfer and levelling characteristics. In comparison to dyestuffs disclosed in French Pat. 792,343, the present dyestuffs have a greater stability to hydrolysis.

SUMMARY OF THE INVENTION

In accordance with this invention, new dyes have been discovered which have a good affinity for natural and synthetic polyamide fibers, including wool, silk and nylon. These compounds dye said fibers from neutral or acid aqueous dyebaths and show good light fastness, solubility, wash and perspiration fastness and barré coverage. In the more preferred dyes of this invention, the dyes possess these properties to a remarkable degree.

The invention is, therefore, concerned with dyestuffs, their application to polyamide fibers and to processes for their preparation.

The compounds of this invention may accordingly be represented by the following structural formula:

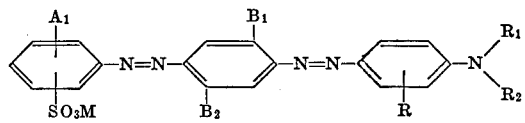

wherein each of $A_1$ is hydrogen, $C_{1-4}$lower alkoxy (preferably $C_{1-2}$), $C_1$-$C_4$lower alkyl (preferably $C_{1-2}$), trifluoromethyl, chloro or bromo, $B_1$ and $B_2$ are each hydrogen, $C_{1-3}$lower alkoxy, $C_{1-3}$lower alkyl, chloro, or bromo, R is hydrogen, $C_{1-4}$lower alkyl (preferably $C_{1-2}$), $C_{1-4}$lower alkoxy (preferably $C_{1-2}$), trifluoromethyl, chloro, bromo or fluoro, $R_1$ and $R_2$ are each $C_{2-6}$hydroxyalkyl, $C_{1-6}$cyanoalkyl, $C_{2-6}$alkoxyalkyl, $C_{1-6}$chloro or bromo lower alkyl, $C_{1-6}$lower alkyl (preferably each of the alkyl moieties of the above groups contain 4 or less carbon atoms), phenyl-$C_{1-2}$lower alkyl or substituted phenyl-$C_{1-2}$lower alkyl, wherein the substituent on the phenyl moiety may be chloro, bromo, lower alkoxy or lower alkyl of up to 4 carbon atoms (especially up to 2 carbon atoms) or cyano, and M is hydrogen, alkali metal (Na, K, Li) or $NH_4^+$.

In the more preferred aspect of this invention, $A_1$ is hydrogen, methyl, methoxy or chloro, and especially in a position ortho to the azo group; $B_1$ and $B_2$ are each hydrogen, methyl or methoxy and preferably when methyl only one of $B_1$ or $B_2$ being methyl at any one time; R is hydrogen, methyl, methoxy or chloro; $R_1$ and $R_2$ are each $C_{2-4}$hydroxyalkyl (especially $C_{2-3}$), $C_{1-4}$cyanoalkyl (especially cyanoethyl), $C_{1-4}$alkyl (especially $C_{1-2}$) or benzyl, and most preferred $R_1$ is lower alkyl or hydroxyalkyl and $R_2$ any of the above, especially cyanoethyl.

The dyestuffs of this invention can be prepared by well-known methods in the art. For example, an appropriate sulfonated aromatic amine may be diazotized and coupled in the paraposition to another appropriate aromatic amine. The second amine may suitably be coupled in the form of its N-methane sulfonic acid and the product thereafter saponified to obtain the desired substituted para-aminoazobenzene compound. This compound is then diazotized by well-known means and reacted with an appropriate coupler of the formula

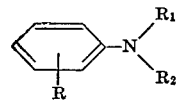

Preferably, in carrying out the process for the preparation of the compounds of this invention, an aniline compound of the formula (1)

may be diazotized in an aqueous hydrochloric acid solution in a normal manner with sodium nitrite. Subsequently, an aniline compound of the formula (or its N-methane sulfonic acid)

(2)
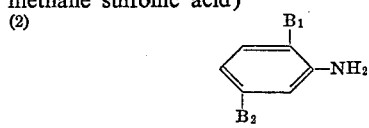

and the diazotized aniline compound described above are coupled under well-known coupling conditions to obtain an intermediate azo compound of the formula (3)
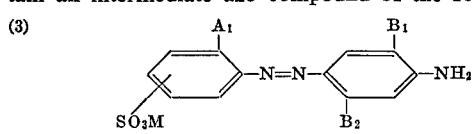

Alternatively, the unsulfonated compound (3) can be prepared in a manner similar to the above process, followed by sulfonation under well-known means to obtain compound (3). This intermediate azo compound may then be appropriately diazotized and subsequently coupled with a coupler of the formula (4)
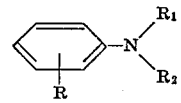

Specific compounds of the formula (1) which may be mentioned are: metanilic acid, sulfanilic acid, 3-amino-4-methoxybenzenesulfonic acid, 3 - amino-4-chlorobenzenesulfonic acid, 3-amino-4-propylbenzenesulfonic acid, 3-amino - 4 - propoxybenzenesulfonic acid, 3-amino-4-bromobenzenesulfonic acid, 4-amino-3-ethylbenzenesulfonic acid, 4-amino - 3 - methylbenzenesulfonic acid, 4-amino-3-ethoxybenzenesulfonic acid and 4-amino-3-chlorobenzenesulfonic acid.

Compounds of formula (2) which may be mentioned are: 2-methoxy-5-methylaniline, 2-ethyl-5-bromoaniline, 2- or 3-methylaniline, 2,5-dichloroaniline, 2,5-dimethoxyaniline, 2,5-dipropoxyaniline, 2,5-diethylaniline, 2-methoxyaniline, 2- or 3-ethylaniline, 2- or 3-chloroaniline and aniline.

Compounds of formula (4) which may be mentioned are:

N-cyanoethyl-N-ethylaniline,
N-cyanoethyl-N-ethyl-m-toluidine,
N-cyanoethyl-N-methylaniline,
N-cyanoethyl-N-methyl-m-toluidine,
N-cyanoethyl-N-butylaniline,
N-hydroxyethyl-N-cyanoethylaniline,
N-hydroxyethyl-N-cyanoethyl-m-toluidine,
N-hydroxyethyl-N-ethylaniline,
N-hydroxyethyl-N-ethyl-m-toluidine,
N-hydroxyethyl-N-methylaniline,
N-hydroxyethyl-N-butylaniline,
N-(2)hydroxypropyl-N-ethylaniline,
N-(2)hydroxypropyl-N-cyanoethylaniline,
N,N-di(hydroxyethyl)aniline,
N,N-di(hydroxyethyl)m-toluidine,
N,N-dihydroxyethyl)-m-chloraniline,
N,N-di(hydroxyethyl)-o-chloraniline,
N,N-di(hydroxypropyl)-o-toluidine,
N,N-di(hydroxypropyl)-m-toluidine,
N,N-di(hydroxyethyl)-o-anisidine,
N,N-di(hydroxyethyl)-m-anisidine,
N-ethyl-N-chloroethylaniline,
N,N-diethylaniline,
N-ethyl-N-benzylaniline,
N-ethyl-N-benzyl-m-toluidine,
N-(2)hydroxyethyl-N-benzylaniline,
N-(2)cyanoethyl-N-benzylaniline,
N-ethyl-N-benzyl-o-anisidine,
N-benzyl-N-(β-cyanoethyl)-3-methoxyaniline,
N-benzyl-N-(β-hydroxybutyl)-3-ethoxyaniline,
N-(p-methylbenzyl)-N-propyl-2-ethylaniline,
N,N-diethyl-3-chloroaniline,
N,N-dipropyl-2-bromoaniline,
N-(m-ethoxybenzyl)-N-butylaniline,
N-(m-chlorobenzyl)-N-ethylaniline,
N-(p-methoxyethylbenzyl)-N-ethylaniline,
N-(p-cyanobenzyl)-N-ethylaniline,
N,N-dibenzylaniline,
N-ethyl-N-methoxyethylaniline,
N-methyl-N-(3-chloropropyl)-aniline,
N-propyl-N-(2-bromoethyl)aniline,
N-benzyl-N-methoxyethylaniline,
N,N-(di-β-cyanoethyl)aniline,
N-phenethyl-N-ethylaniline, and
N-(p-methoxyphenethyl)-N-ethylaniline.

The starting materials used to prepare the dyestuffs of the instant invention are known compounds and can readily be prepared by well-known means. For example, the compounds of formula (4) can be prepared by the action of an appropriate alkylating agent upon a ring substituted aniline compound at an elevated temperature and usually in the presence of an inorganic or organic acid binding agent. Similarly, a ring substituted N-monosubstituted aniline can be reacted with an alkylating agent as above to result in a compound of formula (4) in which $R_1$ and $R_2$ are different.

The compounds of this invention are particularly suitable for dyeing natural and synthetic polyamide fibers, especially nylon, giving dyed fabrics with good properties such as light fastness, wet fastness and barré coverage.

The fibers can readily be dyed or printed, for example, from aqueous dyebaths at pH values of 5.5 to 7.5 and preferably 6.0 to 7.0 at a liquor ratio of 10:1 to 40:1, although other liquor ratios can be employed. The initial pH can be adjusted to the desired value by an appropraite acid or basic treatment or by buffering the solution.

The following examples are given by way of illustration:

Example 1

(A) 20.8 parts by weight of 3-amino-4-chlorobenzenesulfonic acid are dissolved in 100 parts of water and 4 parts of caustic soda. Ice, 20 parts of concentrated hydrochloric acid, and a solution of 7 parts of sodium nitrite in 20 parts of water are added to achieve diazotization at 3–7° C.

(B) 15.3 parts of 2,5-dimethoxyaniline, dissolved at 45° C. in 120 parts of water and 10 parts of concentrated hydrochloric acid, are combined with the diazotized 3-amino - 4-chlorobenzenesulfonic acid and enough ice to keep the temperature below 7° C. and the pH is raised to 2 with 20% soda ash solution. The coupling product 2,5 - dimethoxy - 4-(2'-chloro-5'-sulfobenzeneazo)aniline is separated by filtration, washed with very dilute hydrochloric acid, and dried.

(C) This dried monoazo compound is charged into 110 part of 12% nitrosyl sulfuric acid (in anhydrous sulfuric acid), held at 30–35° C. overnight, and then poured slowly on 250 parts of ice and 20 parts of salt. The rediazotized compound is separated by filtration, reslurried in 800 parts of cold water, combined with a solution of 14 parts of N-β-cyanoethyl-N-ethylaniline in 14 parts of glacial acetic acid, and stirred at room temperature overnight. 4 parts by weight of salt per 100 parts of reaction volume are added and the product is separated by filtration. It is reslurried in 1800 parts of water at 95° C., made slightly alkaline with soda ash, salted with 10 parts by weight of salt per 100 parts of volume, cooled to 70° C., recovered by filtration, and dried. The compound has the structure

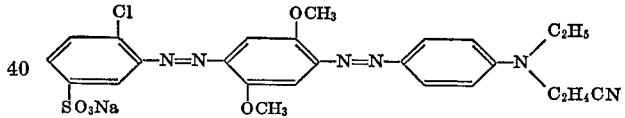

and dyes nylon from neutral or weakly acid dyebaths in very even reddish violet shades of good light and wash fastness.

Example 2

When N-β-hydroxyethyl-N-ethylaniline is used in place of N-β-cyanoethyl-N-ethylaniline in Example 1, a compound is obtained with the structure

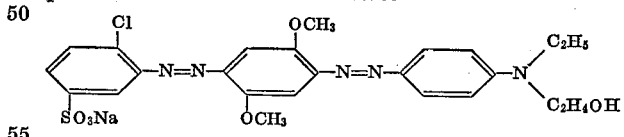

which dyes nylon in very even violet shades of similar characteristics.

Example 3

(A) 17.3 parts of metanilic acid are dissolved in 70 parts of water and 8 parts of 50% by weight caustic soda solution. Ice, 22 parts of concentrated hydrochloric acid, and a solution of 7 parts of sodium nitrite in 20 parts of water are added with sufficient ice to maintain the temperature at 0–3° C. to diazotize the metanilic acid.

(B) 15.3 parts of 2,5-dimethoxyaniline, dissolved at 45° C. in 120 parts of water and 11 parts of concentrated hydrochloric acid are combined with the diazotized metanilic acid, using sufficient ice to keep the temperature below 5° C. and the pH is raised to 2.5 with 20% soda ash solution. After completion of the coupling, the product is dissolved at pH 9 with 50% caustic soda solution and then salted with 50 parts of sodium chloride. Rediazotization is accomplished by addition of 7.5 parts of sodium nitrite, followed by an aqueous solution of 21 parts of naphthalenesulfonic acid and sufficient sulfuric acid to establish a congo acid reaction. A temperature of 32° C. is maintained for 2 hours.

(C) This reaction mass is combined with a solution of 17 parts of N-β-cyanoethyl-N-ethylaniline in 17 parts of glacial acetic acid at 5° C. and the pH is raised to 4, then more slowly, during one hour, to 6 by the addition of a 25% aqueous soda ash solution. Stirring is continued overnight while the temperature is permitted to rise to 15° C.

The product is separated by filtration and washed with a 5% aqueous sodium chloride solution. It has the structure

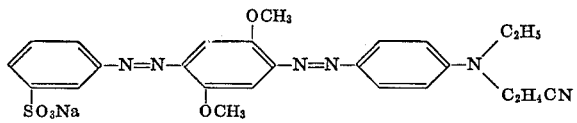

and dyes nylon from weakly acid dyebaths in very even bluish red shades of good light and wash fastness.

Example 4

When N-β-cyanoethyl-N-ethylaniline in Example 3 is replaced by 22 parts of N-benzyl-N-ethyl-m-toluidine and the pH is raised to 6 with lutidine instead of soda ash solution, one obtains a compound of the structure

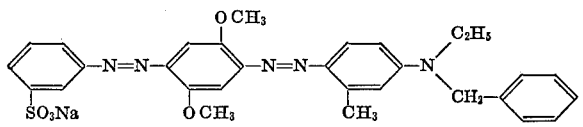

which dyes nylon from neutral dyebaths in very lightfast and washfast violet shades.

Example 5

(A) 17.3 parts of sulfanilic acid are diazotized in 50 parts of ice-water and 11 parts of concentrated hydrochloric acid by the rapid addition of a concentrated solution of 7 parts of sodium nitrite in water at about 4° C.

(B) The resulting diazotized sulfanilic acid is combined at a temperature below 5° C. with 13.7 parts of 2-methoxy-5-methylaniline previously dissolved in 120 parts of water at 45° C. and 11 parts of concentrated hydrochloric acid. Sufficient 20% soda ash solution is added to raise the pH to 3.0 and the mixture is stirred for a period of five hours.

(C) The mixture from B is combined with a solution of 17 parts of N-β-cyanoethyl-N-ethylaniline in 17 parts of glacial acetic acid at 10° C. and the pH is raised to 3, then more gradually to 5 by the addition of a 25% aqueous soda ash solution. Stirring is continued overnight while the temperature is permitted to rise. Finally, some salt is added and the pH is reduced to ca. 1 with concentrated hydrochloric acid. The product is filtered off and washed with tenth normal hydrochloric acid. It is represented by the formula

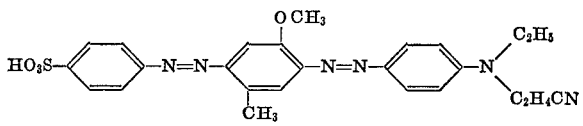

and dyes nylon from neutral or weakly acid dyebaths in even red shades of good light fastness and wash fastness.

Example 6

When N-β-hydroxyethyl-N-ethylaniline is used in place of N-β-cyanoethyl-N-ethylaniline in Example 5, the compound formed is represented by the formula

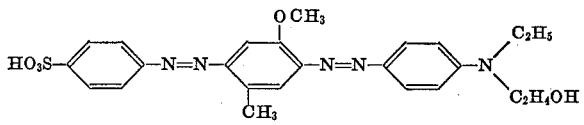

and dyes nylon from neutral dyebaths in very even very bluish red shades.

Example 7

(A) 17.3 parts of metanilic acid are diazotized employing the procedure set forth under Example 3 (A).

(B) The resulting diazotized metanilic acid is combined at a temperature below 5° C. with 13.7 parts of 2-methoxy-5-methylaniline previously dissolved in 120 parts of water at 45° C. and 11 parts of concentrated hydrochloric acid. Sufficient 20% soda ash solution is added to raise the pH to 3.0 and the mixture is stirred for a period of five hours.

After completion of the coupling, the product is filtered off, redissolved in 500 parts of water at 50° C. with 8 parts of sodium chloride after cooling to 20° C. Rediazotization is accomplished by addition of 7.2 parts of sodium nitrite, followed by an aqueous solution of 21 parts of naphthalenesulfonic acid and sufficient sulfuric acid to establish a congo acid reaction. One hour later an amount of sodium chloride equivalent to 20% of the volume of the slurry is added and the slurry cooled to 8° C. The precipitate is collected by filtration.

(C) The precipitate from B is reslurried in 250 parts of ice water and combined with a mixture of 18 parts of N,N-di(β-hydroxyethyl-)aniline, 120 parts of water, and 8 parts of concentrated sulfuric acid. 10 parts of sodium acetate are added, followed by 70 parts of lutidine, and stirring is continued at 2–5° C. overnight.

The product is precipitated from the wine red solution by acidification with concentrated hydrochloric acid, filtered, and washed with tenth normal hydrochloric acid. It has the structure

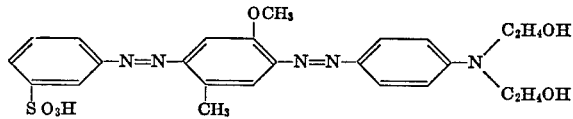

and dyes nylon from weakly acid dyebaths in even and lightfast bluish red shades.

Example 8

When N-β-hydroxyethyl-N-ethylaniline is used in place of N,N-di(β-hydroxyethyl)aniline, a similar product is obtained with the structure

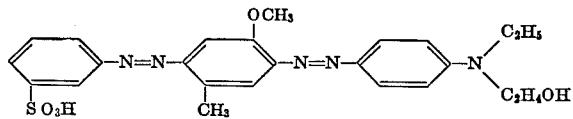

Example 9

(A) 17.3 parts of metanilic acid are diazotized employing the procedure set forth under Example 3 (A).

(B) The pH of the resulting solution is adjusted to 2.5 by addition of sodium bicarbonate. 6.6 parts of sodium acetate is added, followed by the addition of 22.5 parts of o-anisidyl-N-methanesulfonic acid, while maintaining the temperature of the reaction mixture at about 5–7° C. by means of ice and cold water and stirring for a period of 1 hour. 38 parts of a 50% by weight solution of caustic soda are then added and the mass is heated at 100° C. for 8 hours. The mass is then cooled, 28 parts of sodium bicarbonate are added to adjust the pH to 9, salted with 33 parts of sodium chloride and filtered.

The filter cake is dissolved in 800 parts of water at 30° C. To this solution there is added 7 parts of sodium nitrite, followed by addition of an aqueous solution of 21 parts of naphthalenesulfonic acid and sufficient sulfuric acid to establish a congo acid reaction and the mixture maintained at 32° C. for a period of 2 hours.

(C) The mixture from B is cooled to 10° C. and the pH is raised to ca. 3 with soda ash. A solution of 18 parts of N-β-cyanoethyl-N-ethyl-m-toluidine in 18 parts of glacial acetic acid is added over a period of 15 minutes, followed by enough soda ash solution in two hours to approach pH 5. Salt is added after completion of the reaction in the amount of 5 parts by weight per 100 parts of reaction volume and the product is isolated by filtration. It has the structure

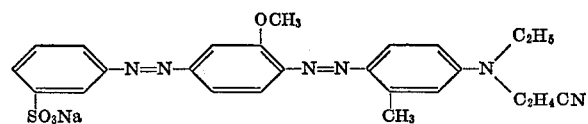

and dyes nylon from neutral or weakly acid dyebaths in very even red shades that possess very good light fastness and wash fastness.

Example 10

Similarly, using N-β-cyanoethyl-N-ethylaniline in place of N-β-cyanoethyl - N - ethyl-m-toluidine, and lutidine to promote the coupling, there is obtained a compound of the structure

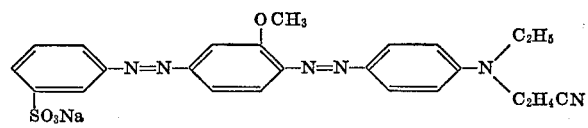

that dyes nylon in scarlet shades with otherwise similar characteristics as mentioned for the preceding compound.

The following examples illustrate further the scope of this invention. These compounds are prepared by following the procedure of the examples as set forth and employing the appropriate starting materials.

When the above-described preparations are carried out with potassium salts and caustic potash in place of sodium salts and caustic soda, the potassium salts of the corresponding dyestuffs are obtained.

Example 46

To obtain the dyes in the form of their free acids, an aqueous suspension of an instant dye is rendered strongly acid with a mineral acid, e.g. concentrated hydrochloric acid, or sulfuric acid and the insoluble acid form of the dye is separated by filtration.

The free acid form of the dye can be neutralized with other bases, as for example lithium hydroxide, lithium carbonate or ammonia, to form dye salts containing the corresponding cations, as desired.

Example 47

Into an aqueous dyebath containing 4000 parts by weight of water, 0.1 parts of the dyestuff described in Example 1, 1 part of nonionic wetting agent, nonylphenyl-polyethylene-glycol ether [ethyleneoxide condensation product of nonylphenol (Tergitol–NPX Union Carbide)], 6 parts of monosodium phosphate and 0.75 parts of disodium phosphate, to maintain a pH of 6.0, 100 parts of nylon fabric are entered at 60° C. The temperature is raised to 100° C. and held at 100° C. for 1 hour while the fabric is mildly agitated to assure uniform dyeing.

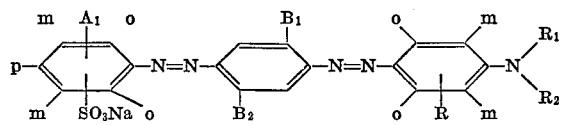

| Procedure of example | Number | Position of $SO_3Na$ | $A_1$ | $B_1$ | $B_2$ | $R$ | $R_1$ | $R_2$ |
|---|---|---|---|---|---|---|---|---|
| 9 | 11 | p | H | H | H | o-$CH_3$ | $C_2H_5$ | $C_2H_4CN$ |
| 9 | 12 | m | H | H | H | H | $C_2H_5$ | $C_2H_4OH$ |
| 9 | 13 | m | H | H | H | o-$CH_3$ | $C_2H_5$ | $C_2H_4CN$ |
| 9 | 14 | m | H | H | H | H | $C_2H_5$ | $C_2H_4CN$ |
| 9 | 15 | m | H | $OCH_3$ | H | H | $C_2H_5$ | $C_2H_4OH$ |
| 7 | 16 | m | H | $OCH_3$ | $CH_3$ | o-$CH_3$ | $C_2H_5$ | $C_2H_4CN$ |
| 7 | 17 | m | o-$OCH_3$ | $OCH_3$ | $CH_3$ | H | $C_2H_4OH$ | $C_2H_4OH$ |
| 7 | 18 | m | o-$OCH_3$ | $OCH_3$ | $CH_3$ | H | $C_2H_5$ | $C_2H_4OH$ |
| 3 | 19 | m | o-$OCH_3$ | $OCH_3$ | $OCH_3$ | H | $C_2H_5$ | $C_2H_4OH$ |
| 3 | 20 | p | o-Cl | $OCH_3$ | $OCH_3$ | H | $C_2H_5$ | $C_2H_4OH$ |
| 3 | 21 | p | o-Cl | $OCH_3$ | $OCH_3$ | o-$CH_3$ | $C_2H_5$ | $C_2H_4CN$ |
| 3 | 22 | p | o-Cl | $OCH_3$ | $OCH_3$ | o-$CH_3$ | $C_2H_4OH$ | $C_2H_4OH$ |
| 9 | 23 | m | H | H | H | H | $C_2H_4OH$ | $CH_2$—⟨phenyl⟩ |
| 9 | 24 | p | H | H | H | H | $C_2H_5$ | $C_2H_4CN$ |
| 9 | 25 | p | H | H | H | H | $C_2H_4OH$ | $C_2H_4CN$ |
| 9 | 26 | m | H | H | $CH_3$ | H | $C_2H_4OH$ | $C_2H_2CN$ |
| 9 | 27 | m | H | H | $CH_3$ | o-$CH_3$ | $C_2H_5$ | $C_2H_4CN$ |
| 9 | 28 | m | H | H | $CH_3$ | H | $C_2H_4OH$ | $C_2H_4OH$ |
| 9 | 29 | m | H | H | $OCH_3$ | H | $CH_3$ | $C_2H_4CN$ |
| 9 | 30 | m | H | $OCH_3$ | H | o-$CH_3$ | $C_2H_4OH$ | $C_2H_4CN$ |
| 9 | 31 | p | o-$CH_3$ | $OCH_3$ | H | o-$CH_3$ | $C_2H_5$ | $C_2H_4CN$ |
| 5 | 32 | p | H | $OCH_3$ | $OCH_3$ | o-$CH_3$ | $C_2H_4OH$ | $C_2H_4OH$ |
| 7 | 33 | m | o-$CH_3$ | $OCH_3$ | $CH_3$ | o-$CH_3$ | $C_2H_5$ | $C_2H_4CN$ |
| 3 | 34 | m | H | $OCH_3$ | $OCH_3$ | H | $CH_3$ | $C_2H_4CN$ |
| 3 | 35 | p | H | $OCH_3$ | $OCH_3$ | o-$CH_3$ | $C_2H_5$ | $C_2H_4CN$ |
| 9 | 36 | m | H | $OCH_3$ | H | H | $CH_2CH$—$OHCH_3$ | $C_2H_4CN$ |
| 9 | 37 | m | H | $OCH_3$ | H | m-Cl | $C_2H_4OH$ | $C_2H_4OH$ |
| 9 | 38 | m | H | $OCH_3$ | H | o-Cl | $C_2H_4OH$ | $C_2H_4OH$ |
| 9 | 39 | m | H | $OCH_3$ | H | H | $CH_2CH$—$OHCH_3$ | $CH_2CHOH$—$CH_3$ |
| 3 | 40 | m | H | $OCH_3$ | $OCH_3$ | H | $CH_3$ | $CH_2$—⟨phenyl⟩—$OCH_3$ |
| 3 | 41 | m | H | $OCH_3$ | $OCH_3$ | H | $C_2H_4CN$ | $C_2H_4$—⟨phenyl⟩ |
| 9 | 42 | m | H | $OCH_3$ | H | H | $C_2H_5$ | $C_2H_4Cl$ |
| 9 | 43 | m | H | $OCH_3$ | H | H | $C_2H_5$ | $C_2H_5$ |
| 9 | 44 | p | H | Br | H | H | $C_2H_4OH$ | $C_2H_4OH$ |
| 9 | 45 | m | H | H | Cl | H | $CH_3$ | $C_2H_4OH$ |

The fabric is then removed from the bath, rinsed with cold water, and dried. It is dyed a very even and fast shade of bordeaux.

Example 48

The procedure of Example 47 is repeated with 0.2 parts of the dyestuffs described in Examples 2, 3, 4, 10 and 11, respectively. One obtains very even and fast shades of violet to scarlet.

Example 49

Into an aqueous dyebath containing 4000 parts of water, 0.05 to 0.5 parts of the dyestuffs described in Examples 5, 7, 18, 24, 25, 26, 29 and 34, respectively, 1 part of nonionic wetting agent, 10 parts of anhydrous sodium sulfate and 10 parts of acetic acid, 100 parts of nylon fabric are entered at 60° C. The temperature is raised to 96° C. in 45 minutes and held at 96° C. for one hour while the fabric is mildly agitated. The fabric is then removed from the bath, rinsed with cold water and dried. It is dyed very even and fast shades of reddish orange to bluish red.

Example 50

Similarly, when 0.05 parts of dyestuff from Example 5 and 0.05 parts of dyestuff from Example 7 are used in the above example, similar results are obtained.

What is claimed is:

1. Diazo dyestuff of the formula

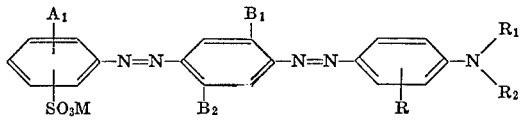

wherein each of $A_1$ is hydrogen, $C_1$-$C_4$ lower alkoxy, $C_1$-$C_4$ lower alkyl, trifluoromethyl, chloro or bromo, $B_1$ and $B_2$ are each hydrogen, $C_{1-3}$ lower alkoxy, $C_{1-3}$ lower alkyl, chloro or bromo, R is hydrogen, $C_{1-4}$ lower alkyl, $C_{1-4}$ lower alkoxy, trifluoromethyl, chloro, bromo or fluoro, $R_1$ and $R_2$ are each $C_{2-6}$ hydrxyalkyl, $C_{1-6}$ cyanoalkyl, $C_{2-6}$ alkoxyalkyl, $C_{1-6}$ chloro or bromo lower alkyl, $C_{1-6}$ lower alkyl, phenyl-$C_{1-2}$ lower alkyl or substituted phenyl-$C_{1-2}$ lower alkyl, wherein the substituent on the phenyl moiety is chloro, bromo, lower alkoxy or lower alkyl of up to 6 carbon atoms or cyano, and M is hydrogen, alkali metal or $NH_4$.

2. Disazo dyestuff of claim 1 wherein $A_1$ is hydrogen, methyl, methoxy or chloro, $B_1$ and $B_2$ are each hydrogen, methyl or methoxy, only one of $B_1$ or $B_2$ being methyl at any one time, R is hydrogen, methyl, methoxy or chloro, and $R_1$ and $R_2$ are each $C_{2-4}$ hydroxyalkyl, $C_{1-4}$ cyanoalkyl, $C_{1-4}$ lower alkyl or benzyl.

3. Disazo dyestuff of claim 2 wherein $R_1$ is $C_{1-3}$ alkyl or $C_{2-3}$ hydroxyalkyl.

4. Disazo dyestuff of claim 2 wherein $R_1$ is $C_{1-3}$ alkyl and $R_2$ is cyanoethyl.

5. A compound of claim 1 of the formula

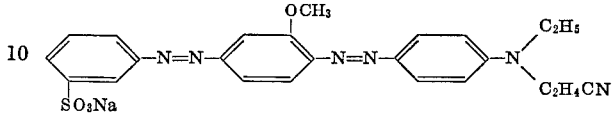

6. A compound of claim 1 of the formula

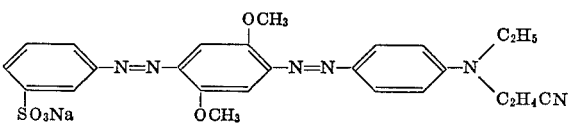

7. A compound according to claim 1 of the formula

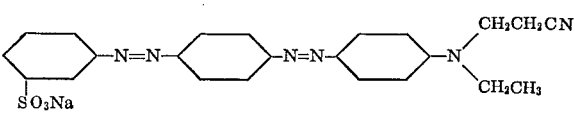

References Cited

UNITED STATES PATENTS

| | | | |
|---|---|---|---|
| 3,637,649 | 1/1972 | Meininger et al. | 260—191 |
| 3,092,616 | 6/1963 | Gaetani | 260—186 |
| 3,096,140 | 7/1963 | Gaetani | 260—174 X |
| 3,222,355 | 12/1965 | Gaetani | 260—186 |
| 3,293,240 | 12/1966 | Koike et al. | 260—186 |
| 3,479,332 | 11/1969 | Jirou et al. | 260—186 |
| 3,485,814 | 12/1969 | Speck | 260—186 |
| 3,502,646 | 3/1970 | Canonica et al. | 260—186 |

FOREIGN PATENTS 792,343  10/1935  France _____ 260—186

OTHER REFERENCES

Farbwerke Hoechst, Chemical Abstracts, volume 73, page 49, Article No. 121537w (1970).

FLOYD DALE HIGEL, Primary Examiner

U.S. Cl. X.R.

8—41 B; 260—178, 184, 205, 206